US007444120B2

(12) United States Patent
Herring et al.

(10) Patent No.: US 7,444,120 B2
(45) Date of Patent: Oct. 28, 2008

(54) ACTIVE TRANSMITTER RINGDOWN FOR SWITCHING POWER AMPLIFIER

(75) Inventors: Richard L. Herring, Wellington, FL (US); Jeffrey T. Oakes, Boca Raton, FL (US); Thomas J. Frederick, Coconut Creek, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 757 days.

(21) Appl. No.: 11/121,899

(22) Filed: May 4, 2005

(65) Prior Publication Data

US 2005/0253721 A1 Nov. 17, 2005

Related U.S. Application Data

(60) Provisional application No. 60/570,031, filed on May 11, 2004.

(51) Int. Cl.
*H04B 5/00* (2006.01)

(52) U.S. Cl. .................................... 455/41.2; 340/10.1

(58) Field of Classification Search ................ 455/41.1, 455/41.2, 41.3, 91, 115.1, 127.1, 127.2; 340/10.1
See application file for complete search history.

(56) References Cited

U.S. PATENT DOCUMENTS

| | | | | |
|---|---|---|---|---|
| 5,781,111 | A * | 7/1998 | Easter et al. | 340/572.3 |
| 6,476,708 | B1 * | 11/2002 | Johnson | 340/10.34 |
| 2002/0196144 | A1 * | 12/2002 | Belka et al. | 340/572.1 |

* cited by examiner

*Primary Examiner*—Nguyen Vo
(74) *Attorney, Agent, or Firm*—Dean D. Small; The Small Patent Law Firm

(57) ABSTRACT

A method for controlling signal decay of a transmitted signal within a transmitter is described. The method includes measuring an amount of current induced back into the transmitter by the decaying signal, and using the current measurement to control the decay of the signal after the signal is transmitted from the load. A transmitter for an electronic article surveillance (EAS) system is also described which includes a current sensing circuit configured to at least sense an amount of current induced back into the transmitter by the load after transmission of the signal, and a transmitter control circuit configured to utilize the sensed current to determine an amount and a polarity of current to be applied to the load to reduce the induced current to a desired value.

21 Claims, 4 Drawing Sheets

ACTIVE TRANSMITTER RINGDOWN FOR SWITCHING POWER AMPLIFIER

CROSS REFERENCE TO RELATED APPLICATIONS

The present application relates to and claims priority from Provisional Application Ser. No. 60/570,031, filed May 11, 2004, titled "Active Transmitter Ringdown For Switching Acoustic-Magnetic Power Amplifier", the entire disclosure of which is hereby incorporated by reference herein in its entirety.

BACKGROUND OF THE INVENTION

1. Field of the Invention

This invention relates generally to the processing of electronic article surveillance (EAS) tag signals, and more particularly to a system and method for reducing circuit ringdown time for a switching amplifier used within an EAS transmitter signal generator.

2. Description of the Related Art

An acoustic-magnetic or magneto-mechanical EAS system excites an EAS tag by transmitting an electromagnetic burst at a resonance frequency of the tag. The tag responds with an acoustic-magnetic or magneto-mechanical response frequency that is detectable by the EAS system receiver. At the end of the transmitter burst, the system detects the exponentially decaying response of the tag. However, because the tag signal amplitude rapidly decays to ambient noise levels, the time interval in which the tag signal can be detected is limited.

In such systems, the transmitter burst signal does not end abruptly, but instead decays exponentially because of transmitter circuit reactance. As a result, it is difficult to detect the tag signal until this circuit "ringdown" has essentially disappeared. Therefore, the time period during which the tag signal can be detected is reduced. This is a particular problem because the circuit ringdown occurs while the tag signal is at its largest.

U.S. Pat. No. 4,510,489 discloses such an EAS system, one embodiment of which is sold under the trademark ULTRA-MAX by Sensormatic Electronics Corporation, Boca Raton, Fla. The ULTRAMAX system uses a pulsed transceiver operating at a particular frequency with a nominal pulse duration. Following the pulse, a receiver portion "listens" for the presence of a tag signal. The load that the power amplifier sees is a high-Q resonant circuit. At the end of the transmit burst, the transmitter signal follows the natural response of the antenna, which is a slow decay of the transmit power. The transmitter signal decays slowly because transmission of a signal results in an electromagnetic field surrounding the transmission antenna. After transmission is completed, the electromagnetic field begins to collapse, the result of this collapsing field is currents being induced within the transmitter.

However, this decay of the transmit signal sometimes interferes with tag reception, because the tag also operates at a frequency approximate that of the transmit signal. The tag signal and the decaying transmitter signal may also overlap in both time and frequency, so it is very difficult to separate the two signals. Furthermore, left to its natural response, the period it takes for the decaying transmit signal to become smaller than the tag signal may cause operational difficulties for the EAS system.

Previous solutions for the circuit ringdown problem have been to switch the transmitter portion of the transceiver into a "de-Q'ing" circuit at the end of the transmit burst time (e.g., at 1.6 ms) in order to reduce the "Q", or quality factor, of the antenna load, for example, from about 25 to about 2. The transmit signal then decays much faster, allowing for earlier detection of the tag signal. However, stored energy in the transmit antenna (the collapsing electromagnetic field) is dissipated in the de-Qing circuit. This stored energy can result in a substantial amount of power to be dissipated and the physical size and cost of the components in the de-Qing circuit can become quite large.

BRIEF DESCRIPTION OF THE INVENTION

A method for controlling signal decay of an electromagnetic transmission from a transmitter is provided. The method may comprise measuring an amount of current induced into the transmitter by a decaying field remaining after the electromagnetic transmission, and using the current measurement to control a decay rate of the decaying field.

Also, a transmitter for an electronic article surveillance (EAS) system is provided which may be configured to output a transmission signal to an external load. The transmitter may comprise a current sensing circuit configured to at least sense an amount of current induced back into the transmitter by the load after transmission of the signal, and a transmitter control circuit configured to utilize the sensed current to determine an amount and a polarity of current to be applied to the load to reduce the induced current to a desired value.

An electronic article surveillance (EAS) system is provided which may comprise a receiver configured to receive signals generated by EAS tags, and a transmitter configured to apply a signal to a load. The transmitter may be further configured to transmit a signal at a resonant frequency of the EAS tag and sense both an amount of current applied to the load during transmission periods and an amount of current induced by the load back into the transmitter during non-transmission periods. The transmitter may also be configured to utilize the sensed currents to control an amount and a polarity of current applied to the load during both transmission periods and non-transmission periods.

BRIEF DESCRIPTION OF THE DRAWINGS

For a better understanding of various embodiments of the invention, reference should be made to the following detailed description which should be read in conjunction with the following figures wherein like numerals represent like parts.

DETAILED DESCRIPTION OF THE INVENTION

For simplicity and ease of explanation, the invention will be described herein in connection with various exemplary embodiments thereof. Those skilled in the art will recognize, however, that the features and advantages of the invention may be implemented in a variety of configurations. It is to be understood, therefore, that the embodiments described herein are presented by way of illustration, not of limitation.

Figure 1:
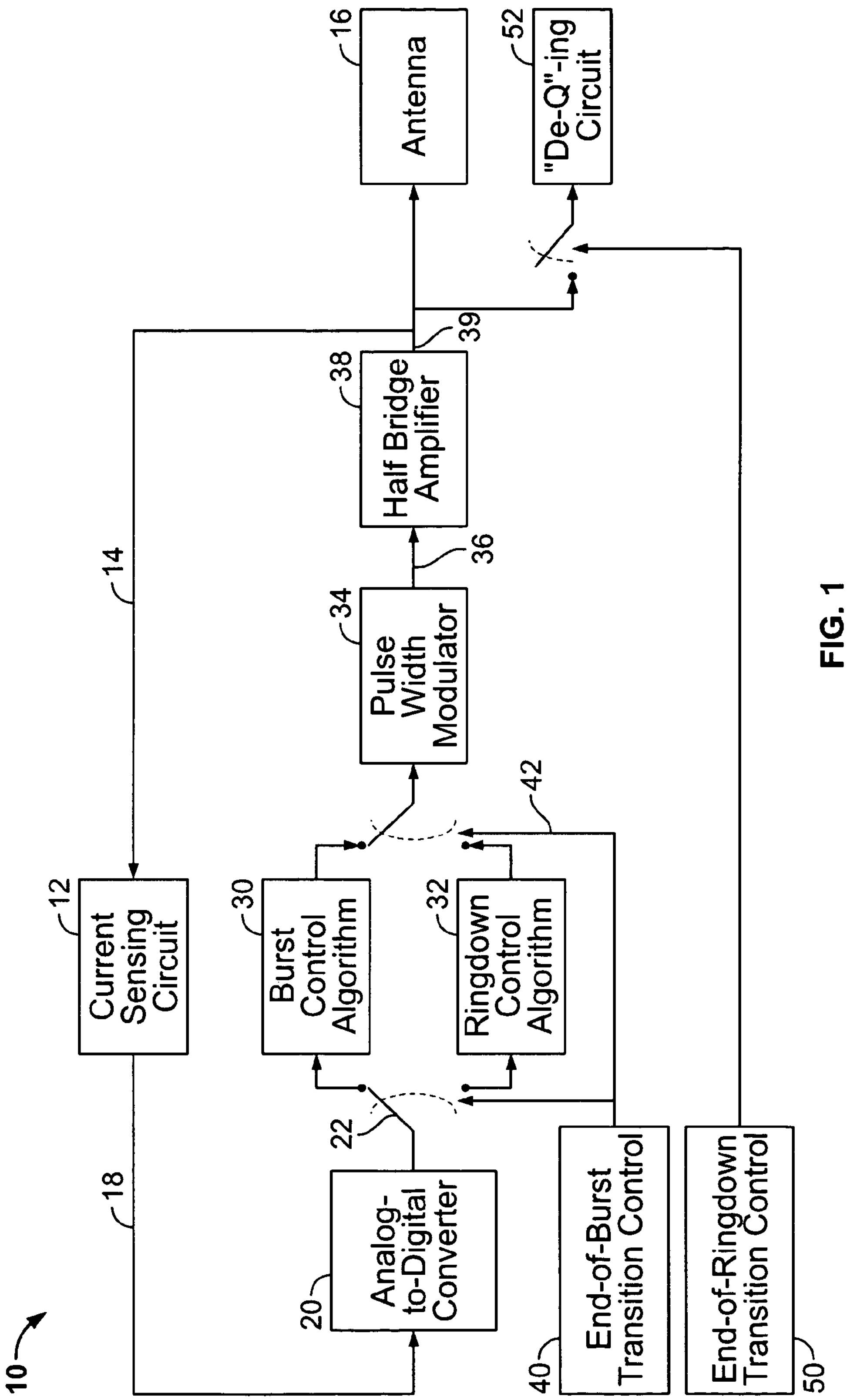
FIG. 1 is a block diagram of an embodiment of an EAS transmitter incorporating active transmitter ringdown according to aspects of the invention.

An embodiment of an EAS transmitter 10 incorporating active transmitter ringdown is illustrated in FIG. 1. As shown in FIG. 1, the EAS transmitter 10 generally may include a current sensing circuit 12, such as a transformer and op amp, which senses an amount of current 14 being used to drive an antenna 16 during a transmission burst. Antenna 16 may be representative of multiple antennas for EAS transmitter 10, and may sometimes be referred to herein as an antenna load. The current sensing circuit 12 may also be operable to determine an amount of current being induced back into the transmitter 10 after a transmission by the above described collapsing electromagnetic field that surrounds the antenna 16 upon completion of a transmission burst. The current sensing circuit 12 also provides a current sense signal 18, which is input into an analog-to-digital converter (ADC) 20 and converted to a digital signal 22. The digital signal 22 may then be switched, via software or hardware, into one or more components that may contain a burst control algorithm component 30 and a ringdown control algorithm component 32.

In the embodiment, the burst control algorithm component 30 may be used to control the operation of a pulse width modulator 34 when EAS transmitter 10 is to generate a pulse modulated signal 36, such as for transmission for detecting a security tag. In the illustrated embodiment, the pulse modulated drive signal 36 is amplified by an amplifier 38, which in the illustrated embodiment is a half bridge amplifier, that supplies an output signal 39 that is transmitted by the antenna 16. While described herein as a half-bridge amplifier, it should be understood that other amplifier types, for example, push-pull and full-bridge amplifiers may be incorporated within an EAS transmitter and the invention is not limited in this regard. A current that is associated with output signal 39 may be sensed by the current sensing circuit 12. While described herein as a pulse width modulator, it is to be understood that other modulator types may be implemented to achieve control of transmitter ringdown.

The ringdown control algorithm component 32 may be used to control the ringdown of the transmitter 10 such that a receiving portion of an EAS system can detect responses from the security tag(s). As described above, the current sensing circuit 12 is also operable to sense currents induced back into the transmitter 10 from the collapsing electromagnetic fields that surround the antenna 16 after completion of a transmission burst. The ringdown control algorithm component 32 uses these sensed currents to reverse polarity of the output signal 39, which causes a faster collapse of the above described electromagnetic field. More specifically, an opposite drive voltage, relative to the amount of induced current, is applied by modulator 34 and amplifier 38 to antenna 16 to more quickly collapse the electromagnetic field surrounding antenna 16 after a transmission burst. By more quickly collapsing such a field, the receiver portion of an EAS system is able to begin receiving tag signals earlier than in known EAS systems.

In one embodiment, burst control algorithm component 30, ringdown control algorithm component 32, and the switching of digital signal 22 may be embodied on a processing chip, for example, a digital signal processor (DSP), the operation of which is well known in the art. The EAS transmitter 10 may switch between the burst control algorithm component 30 and the ringdown control algorithm component 32 in a conventional manner depending on the mode in which (burst or ringdown) the transmitter 10 is operating.

Switching from the burst control mode (and burst control algorithm component 30) to the ringdown control mode (and ringdown control algorithm component 32) may be accomplished, for example, through utilization of an end-of-burst transition control component 40. The end-of-burst transition control component 40, in the embodiment illustrated, is configured to detect the end of the pulse modulated signal burst and generate a control signal 42 for switching from the burst control algorithm component 30 to the ringdown control algorithm component 32.

The ringdown control algorithm component 32 may be configured to cause pulse width modulator 34 to output a signal of correct amplitude and opposite polarity than is induced in the transmitter 10 by the collapsing electromagnetic field. The reversed polarity signal may be amplified by amplifier 38. The result of these two oppositely polarized signals being applied to one another is a rapid decay of the electromagnetic field. As described above, the benefit of such rapid decay is that it allows for the earlier reception of tag signals. In one embodiment, the transmitter 10 is configured to switch back to the burst control mode after a preset time, for example, to begin the next transmission.

The end-of-burst transition control component 40 in FIG. 1 may be formed as part of, for example, the overall software for EAS transmitter 10. In one embodiment, the end-of-burst transition control component 40 may be configured to determine an elapsed time from the start of the transmit burst mode and switches control to the ringdown mode after a desired burst time, for example, 1.6 milliseconds.

Similarly, an end-of-ringdown transition control component 50 may be included, for example, in the overall software for EAS transmitter 10. The end-of-ringdown transition control component 50, in the embodiment illustrated, is configured to switch a de-Q'ing circuit 52 onto the antenna 16 after the ringdown control algorithm component 32 has reduced the current output by amplifier 38 to a pre-determined level. As is understood by those of ordinary skill in the art, the de-Q'ing circuit 52 may simply comprise a resistor, which changes the Q of the antenna 16.

Figure 2:
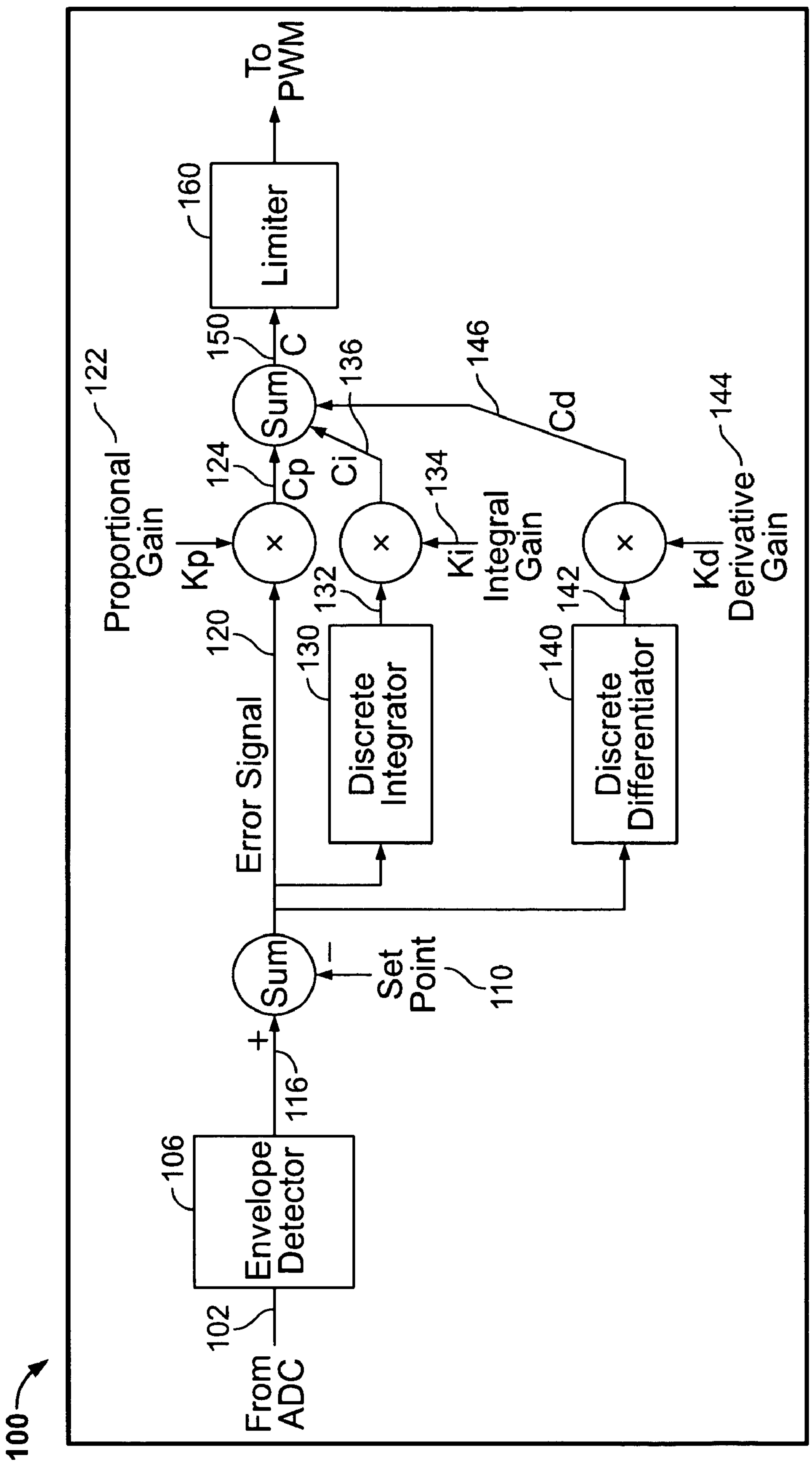
FIG. 2 is a block diagram of a controller for use in controlling transmission bursts and active ringdown in the EAS transmitter of FIG. 1.

FIG. 2 is a block diagram of an embodiment of a control algorithm 100 that may be used to control transmission bursts and active transmitter ringdown in the EAS transmitter of FIG. 1. More specifically, a feedback signal 102 from the ADC 20 (shown in FIG. 1) is received by control algorithm 100, which determines the magnitude of the feedback signal 102. The magnitude of the feedback signal 102 may be determined, for example, using an envelope detector 106. While described as an envelope detector, other algorithms and circuits for determining a magnitude of a signal are known and could be incorporated in place of envelope detector 106 in alternative embodiments and the invention is not limited in this regard.

For the burst control mode, a "Set Point", defined by a set point signal 110, represents a desired transmit current level, for example, 16 amperes. For the ringdown control mode, the Set Point is set to zero, such that the ringdown control algorithm drives the current available to be sensed to zero. Control parameters will typically be different for the two modes (transmission burst and ringdown), for example, the relative weights given to each of the proportional, integral, and derivative components.

The desired current amplitude, as defined by the set point signal 110, is subtracted from the computed current amplitude 116, output by envelope detector 106, producing an error signal 120. The error signal 120 is multiplied by the proportional gain constant 122, Kp, to produce the proportional control value 124, Cp. The error signal 120 is also provided to an integrator equation component 130, the output 132 of which is multiplied by the integral gain constant 134, Ki, to produce the integral control value 136, Ci. In addition, the error signal 120 is also provided to an differentiator equation component 140, the output 142 of which is multiplied by the differential gain constant 144, Kd, to produce the differential control value 146, Cd. The three control components, Cp 124, Ci 136, and Cd 146, are summed to produce the overall control value, or control signal, C 150. The control value, C 150 is limited by a limiter 160 to the allowable range of the pulse width modulator (PWM) circuit, and then used in generation of the output of the PWM 34 (shown in FIG. 1). An example of an allowable range of the PWM is a 50% duty cycle.

Implementation of discrete integral and differentiator equations on digital signal processors may be used as is known to those skilled in the art. Also, selection of suitable gain constants Kp 122, Ki 134, and Kd 144 is dependent on other parameters of the EAS transmitter 10, such as gains in the current sensing circuit 12 and amplifier 38. The design of PID controllers based on "plant" physics is known to those skilled in the art of control theory, and while described herein as a PID controller, it is to be understood that other closed loop controllers may be utilized in the embodiment described herein. Note that the digital signal processor could use other controller topologies, such as fuzzy and/or neural control structures, observer/estimator or state space control structures, etc.

When the burst control algorithm component 30 is in operation, the control components, Cp 124, Ci 136, and Cd 146 may generate a control signal, C 150 based upon the current 14 sensed at the antenna 16. This control signal, C 150 is provided to the pulse width modulator 34 (shown in FIG. 1), which generates a pulse modulated signal 36 (shown in FIG. 1) having a width determined by the control signal, C 150. The operation of pulse width modulator 34 is well known to those of ordinary skill in the art.

The pulse modulated signal 36, in the burst control mode, is thus generated by pulse width modulator 34, and then amplified by amplifier 38 and used to drive the transmission antenna or load (e.g., antenna 16). The transmission pulse (output signal 39) may be output to the antenna 16, and the resultant current 14 is again sensed by current sensing circuit 12, which provides feedback to the control signal generator (e.g., ADC 20) and the burst control algorithm 30. In this manner, the feedback signal 18 (shown in FIG. 1) may be used to set the width of the transmitted signal pulse (output signal 39).

When the ringdown control algorithm component 32 is in operation, the feedback signal 18 may be used to control the pulse width modulator 34 and to reverse the drive signal 36 to the amplifier 38. As used herein, the term reversing the drive signal generally means reversing the polarity of the signal 39 applied to the antenna 16, which facilitates rapid decaying of the transmitter signal by more rapidly collapsing the electromagnetic field surrounding antenna 16 after a transmission burst. After the decaying transmitter signal has been reduced in amplitude to a pre-determined level as described herein, the de-Q'ing circuit 52 may be applied to the load presented by antenna 16 to dissipate the remaining transmitter signal (output signal 39) as is known.

Thus, the various embodiments of the invention provide a method for rapid damping of the transmitter current in a high Q antenna load with a switching power amplifier. Rather than using passive components to reduce or "de-Q" the antenna load and absorb the stored energy, the embodiments described herein utilize an amplifier within the transmitter to drive the current toward zero. Such a configuration is described herein as active transmitter ringdown suppression.

Figure 3:
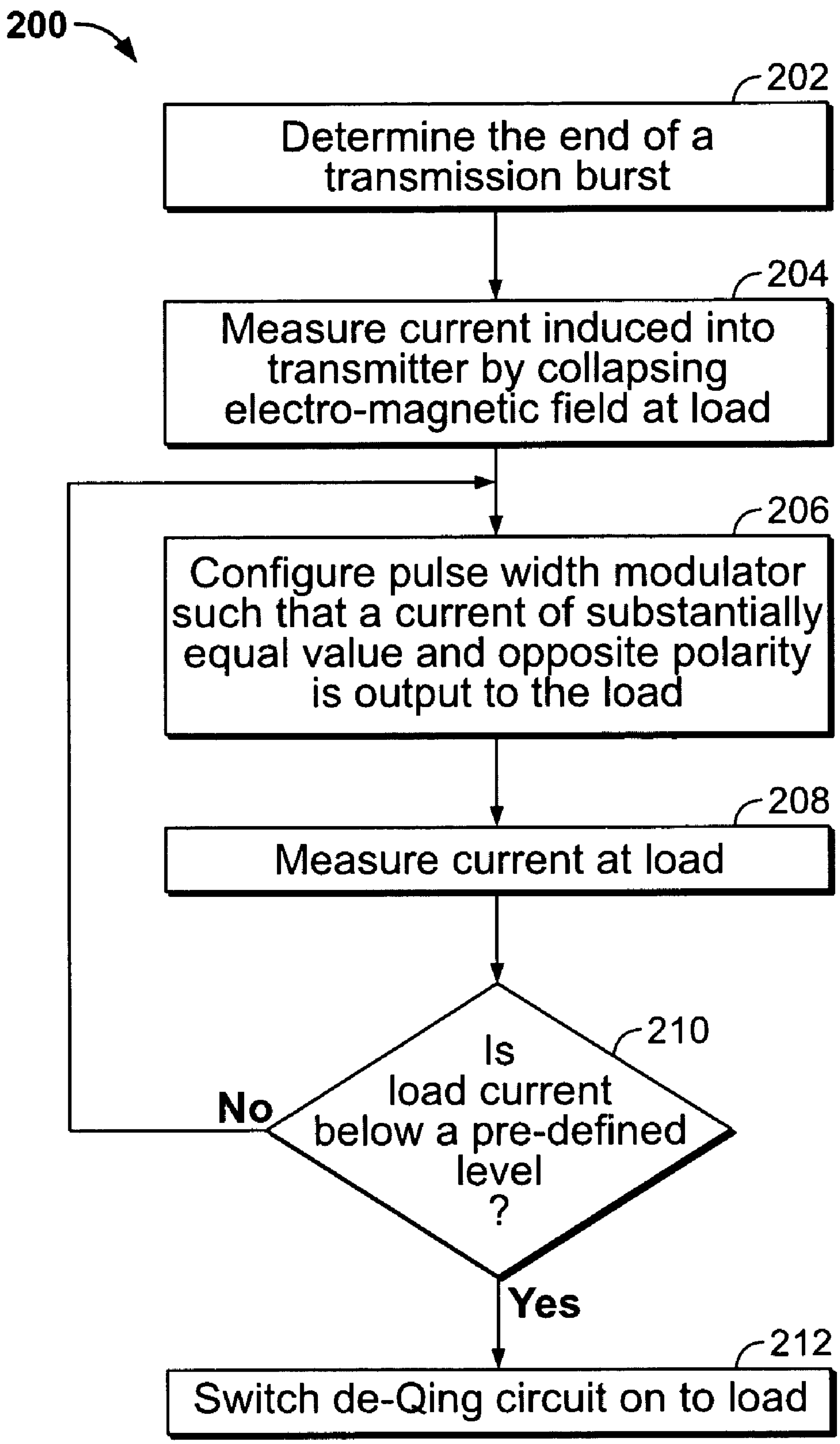
FIG. 3 is a flowchart illustrating operation of an EAS transmitter that incorporates active transmitter ringdown.

FIG. 3 is a flowchart 200 which illustrates operation of the active ringdown control embodiments described herein. First, the end of a transmission burst is determined 202. A current induced into the transmitter (e.g. transmitter 10 shown in FIG. 1) by the collapsing electromagnetic field at the load (antenna 16) may be measured 204. The modulator of the transmitter may be configured 206 such that a current of substantially equal value and opposite polarity is output to the load. The current at the load is again measured 208. If the current measurement is below 210 a pre-defined level, a detuning circuit may be switched 212 onto the load. If the current is not below 210 the pre-defined level, the modulator may again be configured as described above, and the measurement process is repeated.

The current may be driven towards zero in one embodiment by reversing the polarity of a drive signal after the end of the transmission burst and then using feedback to control an amount of the reversed polarity current output by a pulse width modulator and amplifier of the transmitter. After the decaying transmitter signal has been sufficiently reduced in amplitude by this process, for example, to a pre-determined level, a de-Q'ing circuit may be switched onto the antenna load to dissipate any remaining transmitter signal. However, because the remaining transmitter signal at this point in time is much lower in amplitude, the power dissipation requirements (and therefore the cost and size) of the de-Q'ing circuit components are much smaller than those utilized in known circuit ringdown applications.

However, a de-Q'ing circuit may still be needed in certain embodiments because of discrepancies in dynamic range between the current sensing hardware for feedback and the receiver dynamic range, i.e., the smallest signal that can be sensed by the current sensing hardware is on the order of several milliamps. However, this is still typically much larger than the EAS tag signals that are to be detected. In addition, such a configuration significantly reduces the thermal load on the damping components, which improves reliability of the EAS transmitter. More specifically, the various embodiments provide advantages over the prior art by allowing lower cost and higher reliability due to the lower power dissipation requirements of the thermally critical de-Qing circuit 52.

Figure 4:
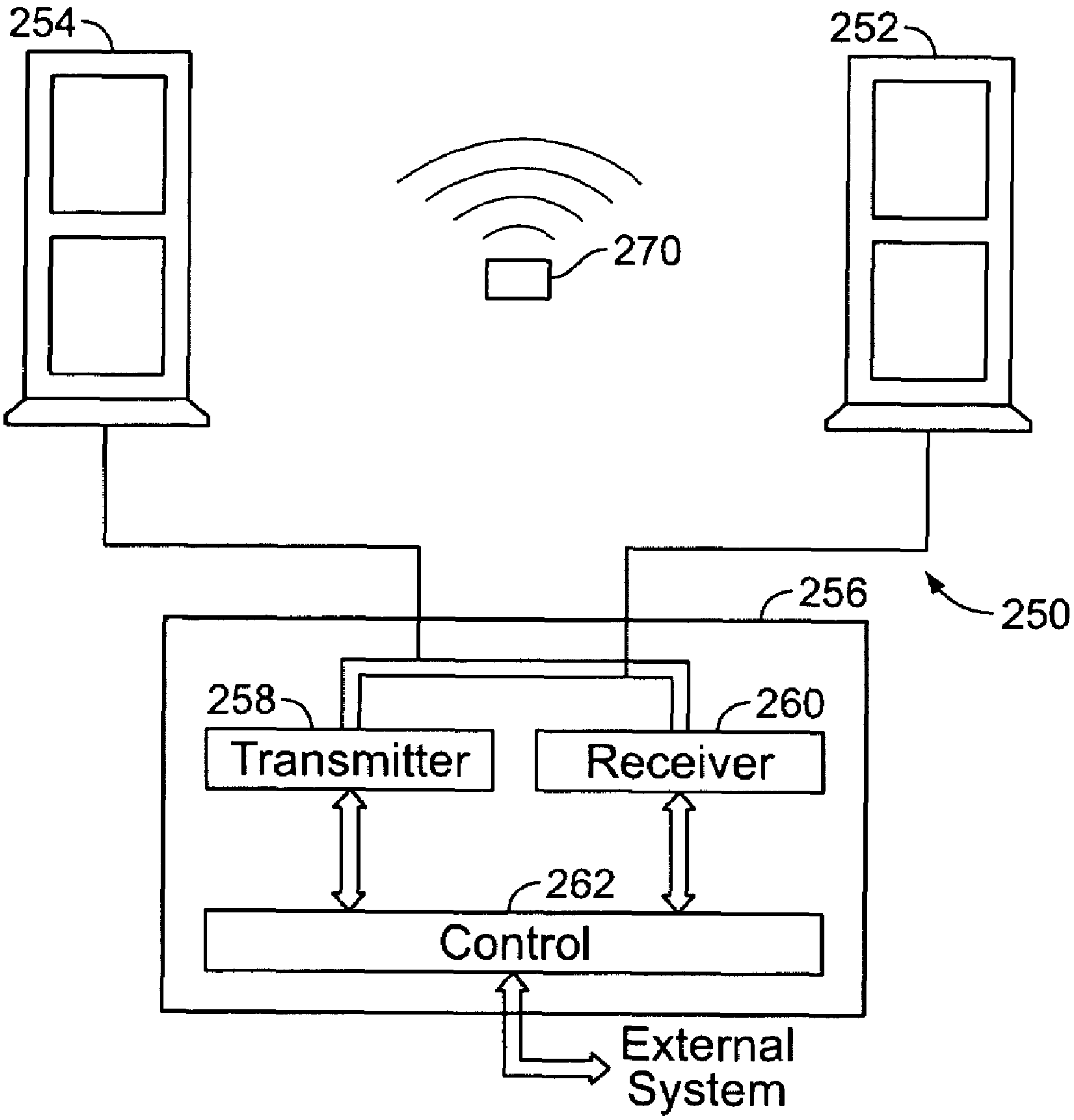
FIG. 4 is an illustration of an EAS system.

FIG. 4 is an illustration of an EAS system 250 which is capable of incorporating the embodiments described herein. Specifically, EAS system 250 includes a first antenna pedestal 252 and a second antenna pedestal 254. The antenna pedestals 252 and 254 are connected to a control unit 256 which includes a transmitter 258 and a receiver 260. Within the control unit 256 a controller 262 may be configured for communication with an external device. In addition, controller 262 may be configured to control transmissions from transmitter 258 and receptions at receiver 260 such that the antenna pedestals 252 and 254 can be utilized for both transmission of signals to an EAS tag 270 and reception of frequencies generated by EAS tag 270. System 250 is representative of many EAS systems and is meant as an example only. For example, in an alternative embodiment, control unit 256 may be located within one of the antenna pedestals. In still another embodiment, additional antennas which only receive frequencies from the EAS tags 270 may be utilized as part of the EAS system. Also a single control unit 256, either within a pedestal or located separately, may be configured to control multiple set of antenna pedestals.

It is to be understood that variations and modifications of the various embodiments of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A method for controlling signal decay of an electromagnetic transmission from a transmitter, said method comprising:

measuring an amount of current induced into the transmitter by a decaying field remaining after the electro-magnetic transmission; and using the current measurement to control a decay rate of the decaying field.

2. A method according to claim 1 wherein using the current measurement to control the decay rate comprises applying a voltage of opposite polarity as the polarity of the measured current.

3. A method according to claim 1 further comprising:

measuring an amount of current output by the transmitter during a transmission burst; and using the current measurements to control a burst control algorithm component configured to control generation of the transmitted signal during a transmission time of the transmitter.

4. A method according to claim 1 further comprising:

determining completion of a first electromagnetic transmission; and initiating a second electromagnetic transmission having an opposite polarity as the first electro-magnetic transmission.

5. A method according to claim 1 further comprising:

determining when the current induced into the transmitter has decayed to a value; and applying a detuning circuit to the transmitter.

6. A method according to claim 1 wherein using the current measurement comprises using the current measurement to determine an amount of opposite polarity current to be output by the transmitter.

7. A method according to claim 1 wherein using the current measurement comprises:

determining a magnitude of the current induced into the transmitter from in-phase and quadrature components of the current measurement; and comparing the magnitude of the current measurement against a desired transmitter current to set a current output level for the transmitter.

8. A transmitter for an electronic article surveillance (EAS) system, said transmitter configured to output a transmission signal to an external load, said transmitter comprising:

a current sensing circuit configured to at least sense an amount of current induced back into said transmitter by the load after transmission of the signal; and a transmitter control circuit configured to utilize the sensed current to determine an amount and a polarity of current to be applied to the load to reduce the induced current to a desired value.

9. A transmitter according to claim 8 wherein said transmitter comprises a modulator configured to output the transmission signal, said transmitter control circuit configured to reverse polarity of the transmission signal after completion of a transmission period.

10. A transmitter according to claim 8 wherein said current sensing circuit comprises an analog-to-digital converter.

11. A transmitter according to claim 8 wherein said current sensing circuit is further configured to sense an amount of current applied to the load during a signal transmission, and wherein said transmitter control circuit comprises an end-of burst transition control algorithm programmed with the transmission periods of said transmitter, said end-of burst transition control algorithm configured to switch the sensed current signals from a burst control algorithm to a ringdown control algorithm after completion of a transmission period for said transmitter.

12. A transmitter according to claim 8 further comprising a detuning circuit and wherein said transmitter control circuit comprises an end-of ringdown transition control algorithm programmed to switch said detuning circuit onto the load upon determining that an amount of current being applied to the load after completion of a transmission period is below a threshold.

13. A transmitter according to claim 8 wherein said transmitter control circuit comprises a burst control algorithm configured to receive the sensed current during a transmission period for said transmitter, said burst control algorithm comprising a controller programmed to:

compare an amount of current applied to the load with a desired load current resulting in an error signal; and utilize the error signal to adjust an amount of current being applied to the load.

14. A transmitter according to claim 8 wherein said transmitter control circuit comprises a ringdown control algorithm configured to receive the sensed current induced into said transmitter by the load, said ringdown control algorithm comprising a controller programmed to:

compare an amount of current induced back into said transmitter by the load with a desired current amount resulting in an error signal; and utilize the error signal to determine an amount and a polarity for a current to be applied to the load.

15. A transmitter according to claim 8 wherein said transmitter control circuit comprises a proportional, integral, derivative controller.

16. A transmitter according to claim 8 wherein said transmitter control circuit comprises a ringdown control algorithm configured to receive the sensed current during a non-transmission period for said transmitter, said ringdown control algorithm comprising a controller programmed to:

compare an amount of current induced back into said transmitter by the load with a desired current amount resulting in an error signal; and apply the error signal to a closed loop controller configured to control an amount and a polarity of current being applied to the load.

17. An electronic article surveillance (EAS) system comprising:

a receiver configured to receive signals generated by EAS tags; and a transmitter configured to apply a signal to a load and further configured to transmit a signal at a resonant frequency of the EAS tag, said transmitter further configured to sense both an amount of current applied to the load during transmission periods and an amount of current induced by the load back into said transmitter during non-transmission periods, said transmitter configured to utilize the sensed currents to control an amount and a polarity of current applied to the load during both transmission periods and non-transmission periods.

18. An EAS system according to claim 17 wherein said transmitter comprises:

a modulator applying the current to the load; and a transmitter control circuit configured to reverse a polarity of a signal output by said modulator after completion of a transmission period.

19. An EAS system according to claim 17 wherein said transmitter comprises an end-of burst transition control algorithm configured with the transmission periods of said transmitter, said end-of burst transition control algorithm configured to switch the sensed current signals from a burst control algorithm to a ringdown control algorithm after completion of a transmission period for said transmitter.

20. An EAS system according to claim 17 wherein said transmitter comprises:

a detuning circuit; and an end-of ringdown transition control algorithm programmed to switch said detuning circuit onto said load upon determining that an amount of current being applied to the load is below a threshold.

21. An EAS system according to claim 17 wherein said transmitter comprises a ringdown control algorithm configured to receive the sensed current induced back into said transmitter during a non-transmission period for said transmitter, said ringdown control algorithm comprising a controller programmed to:

compare an amount of current induced into said transmitter by the load with a desired current amount resulting in an error signal; and utilize the error signal to determine an amount and a polarity for a current to be applied to the load.

* * * * *